US012732339B2

(12) United States Patent
Yang et al.

(10) Patent No.: US 12,732,339 B2
(45) Date of Patent: Sep. 8, 2026

(54) CLOCK FREQUENCY DETERMINING METHOD AND APPARATUS

(71) Applicant: HUAWEI TECHNOLOGIES CO., LTD., Shenzhen (CN)

(72) Inventors: Ganghua Yang, Shanghai (CN); Haihua Shen, Shanghai (CN); Wenliang Liang, Shanghai (CN); Enbo Wang, Shanghai (CN); Jianjun Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 18/390,615

(22) Filed: Dec. 20, 2023

(65) Prior Publication Data

US 2024/0137199 A1 Apr. 25, 2024

Related U.S. Application Data

(63) Continuation of application No. PCT/CN2022/096484, filed on May 31, 2022.

(30) Foreign Application Priority Data

Jun. 23, 2021 (CN) ......................... 202110699284.8

(51) Int. Cl.
*H04B 10/2575* (2013.01)
*H04B 1/7163* (2011.01)
(Continued)

(52) U.S. Cl.
CPC ......... *H04L 7/0075* (2013.01); *H04B 1/7163* (2013.01); *H04B 10/2575* (2013.01);
(Continued)

(58) Field of Classification Search
CPC .. H04B 10/2575–25759; H04L 7/0075; H04Q 2213/13214; H04Q 2213/1336; H04W 56/001
(Continued)

(56) References Cited

U.S. PATENT DOCUMENTS 5,710,651 A * 1/1998 Logan, Jr. ........ H04B 10/25758 398/201
9,391,764 B2 * 7/2016 Mayer .................. H04L 7/0008
(Continued)

FOREIGN PATENT DOCUMENTS

CN 109005584 B * 4/2021 ........ H04W 56/0015

OTHER PUBLICATIONS

IEEE Std 802.15.4™—2011,Part 15.4: Low-Rate Wireless Personal Area Networks (LR-WPANs),Sep. 5, 2011,total 314 pages.
(Continued)

*Primary Examiner* — Li Liu
(74) *Attorney, Agent, or Firm* — HAUPTMAN HAM, LLP

(57) ABSTRACT

This application provides a clock frequency determining method and a clock frequency determining apparatus. The method includes: An access network device receives a combined optical signal from a radio over fiber RoF device, where the combined optical signal is obtained by coupling an optical signal of a first frequency and an optical signal of a second frequency; the access network device converts the combined optical signal into an electrical signal; and the access network device sets a local clock frequency based on a signal frequency of the electrical signal and a first preset rule, where the signal frequency of the electrical signal is equal to an absolute value of a frequency difference between the first frequency and the second frequency.

20 Claims, 6 Drawing Sheets

(51) Int. Cl.
*H04J 3/06* (2006.01)
*H04L 7/00* (2006.01)
*H04W 56/00* (2009.01)

(52) U.S. Cl.
CPC ......... *H04J 3/0638* (2013.01); *H04W 56/001* (2013.01); *H04Q 2213/13214* (2013.01); *H04Q 2213/1336* (2013.01)

(58) Field of Classification Search
USPC .................................. 398/115–117, 154, 155
See application file for complete search history.

(56) References Cited

U.S. PATENT DOCUMENTS

2003/0058495 A1* 3/2003 Brindel ................ H04B 10/508 398/75
2003/0103213 A1* 6/2003 Adams ...................... G01J 9/00 356/484
2004/0213338 A1* 10/2004 Strawczynski ...... H04B 10/077 375/224
2007/0019959 A1* 1/2007 Retnasothie ..... H04B 10/25752 370/335
2008/0075464 A1* 3/2008 Maleki ............... G02B 6/29395 398/85
2012/0002967 A1* 1/2012 Mayer ................... H04L 7/0008 398/115
2020/0229124 A1* 7/2020 Soriaga ................. H04W 4/023
2022/0190920 A1* 6/2022 El Amili .......... H04B 10/25758

OTHER PUBLICATIONS

IEEE Std 1588™—2008,IEEE Standard for a Precision Clock Synchronization Protocol for Networked Measurement and Control Systems,Jul. 24, 2008,total 289 pages.

* cited by examiner

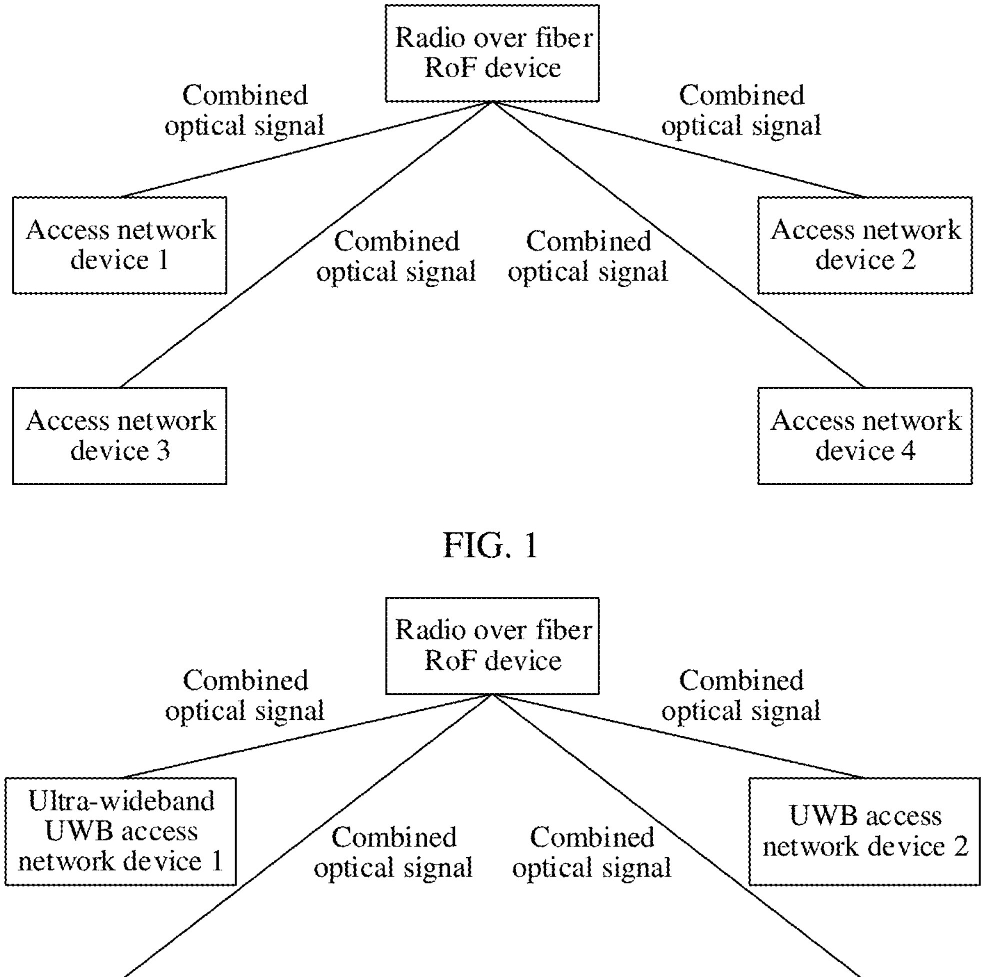
Radio over fiber
RoF device
Combined
optical signal
Combined
optical signal
Access network
device 1
Combined
optical signal
Combined
optical signal
Access network
device 2
Access network
device 3
Access network
device 4
FIG. 1
Radio over fiber
RoF device
Combined
optical signal
Combined
optical signal
Ultra-wideband
UWB access
network device 1
Combined
optical signal
Combined
optical signal
UWB access
network device 2
UWB access
network device 3
UWB access
network device 4
FIG. 2

CLOCK FREQUENCY DETERMINING METHOD AND APPARATUS

CROSS-REFERENCE TO RELATED APPLICATIONS

This disclosure is a continuation of International Application No. PCT/CN2022/096484, filed on May 31, 2022, which claims priority to Chinese Patent Application No. 202110699284.8, filed on Jun. 23, 2021. The disclosures of the aforementioned applications are hereby incorporated by reference in their entireties

TECHNICAL FIELD

This application relates to the field of communications technologies, and in particular, to a clock frequency determining method and apparatus.

BACKGROUND

Currently, the wireless positioning technology plays a very important role in intelligent transportation, geological survey, emergency rescue, and it is of practical significance to study a precise wireless positioning method. Currently, a wireless positioning system mainly includes the following several systems: Bluetooth, wireless fidelity (wireless fidelity, Wi-Fi), ultra-wideband (ultra wide-band, UWB), and a wireless cellular network. Wireless positioning methods used in the wireless positioning system are classified into two types based on whether a ranging manner is used: a ranging-based wireless positioning method and a non-ranging-based wireless positioning method. The ranging-based wireless positioning method mainly includes a time difference of arrival (time difference of arrival, TDOA) wireless positioning method, a time of arrival (time of arrival, TOA) wireless positioning method, and the like. In the TDOA-based wireless positioning method, location coordinates of a to-be-measured target node are estimated by measuring a signal flight time difference between the to-be-measured target node and positioning base stations. Therefore, strict clock synchronization needs to be maintained between the positioning base stations.

Generally, clock synchronization may be understood as time and frequency synchronization. Currently, each positioning base station in a UWB system and a wireless cellular network system usually uses a crystal oscillator inside the positioning base station to generate an oscillation frequency, and after the oscillation frequency is multiplied to a high frequency by using a phase-locked loop, the oscillation frequency is used as a clock frequency of the base station, to maintain frequency synchronization between the positioning base stations. However, individual differences exist between crystal oscillators in a manufacturing process. Therefore, even if crystal oscillators used by the positioning base stations have a same specification, an error may exist between frequencies of the positioning base stations in actual operation, and high-precision clock synchronization cannot be ensured. Based on this, how to improve clock synchronization precision to implement high-precision positioning becomes one of problems that urgently need to be resolved currently.

SUMMARY

This application provides a clock frequency determining method and apparatus, to improve clock synchronization precision.

According to a first aspect, this application provides a clock frequency determining method, and the method is applicable to an access network device. The method includes: receiving a combined optical signal from a radio over fiber RoF device, where the combined optical signal is obtained by coupling an optical signal of a first frequency and an optical signal of a second frequency; converting the combined optical signal into an electrical signal; and setting a local clock frequency based on a signal frequency of the electrical signal and a first preset rule, where the signal frequency of the electrical signal is equal to an absolute value of a frequency difference between the first frequency and the second frequency.

In this application, a unified external reference clock is used (that is, a clock frequency is determined based on the signal frequency of the electrical signal converted from the combined optical signal provided by the RoF device), so that clock frequencies of access network devices are highly consistent, and no clock drift and asynchronization occur in a short time. In addition, a high-frequency clock (for example, greater than 63.8976 GHz) can be generated based on the RoF device. Therefore, compared with that a maximum clock frequency of 63.8976 GHz can be provided by using a crystal oscillator, in this application, clock synchronization precision can be improved, and tag positioning precision can be further improved because the clock synchronization precision directly affects the tag positioning precision.

In a possible implementation, the first preset rule includes:

the local clock frequency is the signal frequency of the electrical signal.

In this application, the local clock frequency is set to the signal frequency of the electrical signal converted from the combined optical signal, which is easy to operate and has stronger adaptability.

In a possible implementation, the first preset rule includes:

the local clock frequency meets: $f_0=f_1/N$, where $f_0$ represents the local clock frequency, $f_1$ represents the signal frequency of the electrical signal, and N is an integer greater than 1.

In this application, the signal frequency of the electrical signal is used as the local clock frequency after being reduced. This improves implementation diversity of setting the local clock frequency, is applicable to scenarios with different clock synchronization precision requirements, and has high adaptability.

In a possible implementation, the method further includes:

synchronizing local clock time with clock time of another access network device in a positioning system in which the access network device is located;

after the local clock frequency and the local clock time are synchronized with a clock frequency and the clock time of the another access network device in the positioning system, receiving a positioning signal from a terminal device, and determining a receiving timestamp at which the positioning signal is received; and sending the positioning signal and the receiving timestamp to a positioning platform, where the positioning signal and the receiving timestamp are used to determine a location of the terminal device.

In this application, after high-precision clock synchronization (that is, both clock frequencies and clock time are synchronized) is implemented between access network devices in the positioning system, the terminal device (or referred to as a tag) is positioned, so that tag positioning precision can be further improved.

In a possible implementation, the access network device is an ultra-wideband UWB access network device, and the sending the positioning signal and the receiving timestamp to a positioning platform includes:

sending the positioning signal and the receiving timestamp to the positioning platform by using a cellular-network access network device.

In this application, the UWB access network device is externally connected to the cellular-network access network device, to receive the positioning signal from the terminal device after clock synchronization is implemented between UWB access network devices, and send the positioning signal and the receiving timestamp to the positioning platform by using the access network device in cellular network for positioning, to assist a cellular network in improving precision of positioning the terminal device, and ensure application in a future 5G/6G indoor scenario.

In a possible implementation, the absolute value of the frequency difference between the first frequency and the second frequency is not less than a preset threshold.

In a possible implementation, the preset threshold is 63.8976 GHz.

According to a second aspect, this application provides a clock frequency determining method, and the method is applicable to a radio over fiber RoF device. The method includes: generating a combined optical signal, where the combined optical signal is obtained by coupling an optical signal of a first frequency and an optical signal of a second frequency, and an absolute value of a frequency difference between the first frequency and the second frequency is used to determine a clock frequency of a positioning system in which the RoF device is located; and sending the combined optical signal.

In a possible implementation, the absolute value of the frequency difference between the first frequency and the second frequency is not less than a preset threshold.

In a possible implementation, the preset threshold is 63.8976 GHz.

According to a third aspect, this application provides a communication apparatus. The communication apparatus may be an access network device. The apparatus includes: a transceiver unit, configured to receive a combined optical signal from a radio over fiber RoF device, where the combined optical signal is obtained by coupling an optical signal of a first frequency and an optical signal of a second frequency; and a processing unit, configured to convert the combined optical signal into an electrical signal. The processing unit is further configured to set a local clock frequency based on a signal frequency of the electrical signal and a first preset rule, where the signal frequency of the electrical signal is equal to an absolute value of a frequency difference between the first frequency and the second frequency.

In a possible implementation, the first preset rule includes:

the local clock frequency is the signal frequency of the electrical signal.

In a possible implementation, the first preset rule includes:

the local clock frequency meets: $f_0=f_1/N$, where $f_0$ represents the local clock frequency, $f_1$ represents the signal frequency of the electrical signal, and N is an integer greater than 1.

In a possible implementation, the processing unit is further configured to synchronize local clock time with clock time of another access network device in a positioning system in which the access network device is located;

the processing unit is further configured to: after the local clock frequency and the local clock time are synchronized with a clock frequency and the clock time of the another access network device in the positioning system, receive a positioning signal from a terminal device, and determine a receiving timestamp at which the positioning signal is received; and the transceiver unit is further configured to send the positioning signal and the receiving timestamp to a positioning platform, where the positioning signal and the receiving timestamp are used to determine a location of the terminal device.

In a possible implementation, the access network device is an ultra-wideband UWB access network device, and the processing unit is specifically configured to:

send the positioning signal and the receiving timestamp to the positioning platform by using a cellular-network access network device.

In a possible implementation, the absolute value of the frequency difference between the first frequency and the second frequency is not less than a preset threshold.

In a possible implementation, the preset threshold is 63.8976 GHz.

According to a fourth aspect, this application provides a communication apparatus. The apparatus may be a radio over fiber RoF device. The apparatus includes: a processing unit, configured to generate a combined optical signal, where the combined optical signal is obtained by coupling an optical signal of a first frequency and an optical signal of a second frequency, and an absolute value of a frequency difference between the first frequency and the second frequency is used to determine a clock frequency of a positioning system in which the RoF device is located; and a transceiver unit, configured to send the combined optical signal.

In a possible implementation, the absolute value of the frequency difference between the first frequency and the second frequency is not less than a preset threshold.

In a possible implementation, the preset threshold is 63.8976 GHz.

According to a fifth aspect, this application provides a communication apparatus. The apparatus may be an access network device, an apparatus in an access network device, or an apparatus that can be used together with an access network device. The communication apparatus may alternatively be a chip system. The communication apparatus may perform the method according to the first aspect. A function of the communication apparatus may be implemented by hardware, or may be implemented by executing corresponding software by hardware. The hardware or the software includes one or more units or modules corresponding to the function. The unit or the module may be software and/or hardware. For operations performed by the communication apparatus and beneficial effects thereof, refer to the method in the first aspect and the beneficial effects thereof. Repeated parts are not described again.

According to a sixth aspect, this application provides a communication apparatus. The apparatus may be a RoF device, an apparatus in a RoF device, or an apparatus that can be used together with a RoF device. The communication apparatus may alternatively be a chip system. The communication apparatus may perform the method according to the second aspect. A function of the communication apparatus may be implemented by hardware, or may be implemented by executing corresponding software by hardware. The hardware or the software includes one or more units or modules corresponding to the function. The unit or the module may be software and/or hardware. For operations performed by the communication apparatus and beneficial effects thereof, refer to the method in the second aspect and the beneficial effects thereof. Repeated parts are not described again.

According to a seventh aspect, this application provides a communication apparatus. The communication apparatus includes a processor and a transceiver. The processor and the transceiver are configured to execute a computer program or instructions stored in at least one memory, so that the apparatus implements the method according to either of the first aspect and the second aspect. The memory herein may be an external memory connected to the communication apparatus, or may be coupled to the processor and the transceiver in the communication apparatus, to serve as an internal memory of the communication apparatus. This is not limited herein.

According to an eighth aspect, this application provides a communication apparatus. The communication apparatus includes a processor, a transceiver, and a memory. The processor, the transceiver, and the memory are coupled. The processor and the transceiver are configured to implement the method according to either of the first aspect and the second aspect.

According to a ninth aspect, this application provides a computer-readable storage medium. The storage medium stores a computer program or instructions, and when the computer program or the instructions are executed by a computer, the method according to either of the first aspect and the second aspect is implemented.

According to a tenth aspect, this application provides a computer program product including instructions. The computer program product includes computer program code, and when the computer program code is run on a computer, the method according to either of the first aspect and the second aspect is implemented.

According to an eleventh aspect, an embodiment of this application provides a positioning system. The positioning system includes one or more of the access network device provided in the third aspect and the RoF device provided in the fourth aspect.

BRIEF DESCRIPTION OF DRAWINGS

FIG. 1 is a schematic diagram of a structure of a positioning system according to an embodiment of this application;

FIG. 2 is a schematic diagram of another structure of a positioning system according to an embodiment of this application;

DESCRIPTION OF EMBODIMENTS

Figure 3:
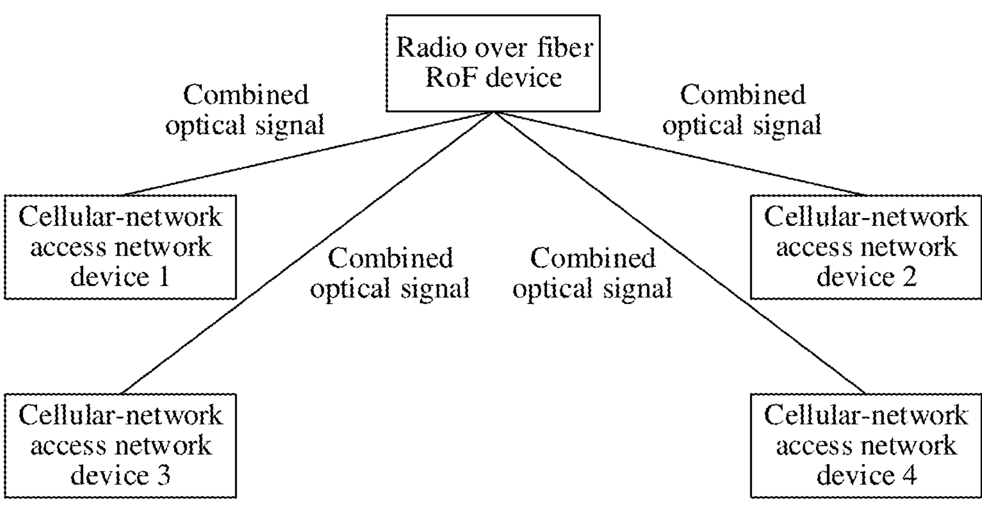
FIG. 3 is a schematic diagram of another structure of a positioning system according to an embodiment of this application.

The following clearly and completely describes the technical solutions in embodiments of this application with reference to the accompanying drawings in embodiments of this application.

In descriptions of this application, unless otherwise specified, "/" means "or". For example, A/B may indicate A or B. The term "and/or" in embodiments of this application describes only an association relationship for describing associated objects and represents that three relationships may exist. For example, "A and/or B" may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In this application, the term "example" or "for example" is used to represent giving an example, an illustration, or a description. Any embodiment or design solution described as "example" or "for example" in this application should not be explained as being more preferred or having more advantages than another embodiment or design solution. Exactly, use of the word such as "example" or "for example" is intended to present a related concept in a specific manner.

With the development of communications technologies, wireless communication enables diversified applications in various industries in the future. A large quantity of application scenarios, such as Internet of Vehicles, self-driving, smart manufacturing, smart logistics, an uncrewed aerial vehicle, asset tracking, a smart grid, and a smart mine, have a high requirement on a positioning capability. For example, in the Internet of Vehicles, vehicle formation and active collision avoidance require positioning precision of up to 30 centimeters, and require a positioning capability that supports high-speed movement and an ultra-low latency. Remote control of an uncrewed aerial vehicle requires 10 to 50 centimeters. For example, in the smart mine, a precise positioning technology can be used to achieve goals of reduced human presence in mining, intelligent transportation, unattended operation, self-driving, and intelligent management and control. This improves an inherent secure production level of a mining enterprise, thereby helping the mining enterprise accelerate the development of intelligence and finally achieve a goal of reduced human presence and unmanned operation. For another example, a large quantity of applications, such as asset tracking and AR/VR, are concentrated indoors, and have a higher requirement on positioning precision. From a technical perspective, a wireless positioning system mainly includes the following several communication systems: Bluetooth, wireless fidelity (wireless fidelity, Wi-Fi), ultra-wideband, and a wireless cellular network.

To facilitate understanding of related content in embodiments of this application, the following describes some knowledge required in the solutions in this application.

1. Ultra-Wideband (Ultra Wide-Band, UWB) Positioning System

UWB is a new type of wireless communications technology. According to the specifications of the Federal Communications Commission, an operating frequency band of UWB is 3.1 GHz to 10.6 GHz. UWB includes the following main advantages: low power consumption, insensitivity to channel fading (such as fading of multipath and non-line-of-sight channels), a strong anti-interference capability, no interference to another device in a same environment, a strong penetration capability (where positioning can be performed in an environment in which a brick wall is penetrated), and high positioning accuracy and positioning precision. UWB transmits data by sending and receiving ultra-narrow pulses at nanosecond or even sub-nanosecond levels. One information bit can be mapped to hundreds of such pulses. This nanosecond-level time-domain pulse signal can usually generate a frequency-domain bandwidth of a GHz magnitude. These nanosecond-level time-domain pulses enable a UWB signal to have extremely high time resolution, which is very suitable for high-precision positioning. However, as the UWB positioning system is widely used, the market imposes a higher requirement on positioning precision of the UWB positioning system. For example, a positioning target is required to be within 10 centimeters in a smart mine project (to achieve a goal of unmanned operation) and a complex scenario in the future.

2. Wireless Cellular Network Positioning System

Wireless cellular network positioning is a positioning technology defined in 3 GPP Rel-16. Indoor positioning precision of wireless cellular network positioning can reach 3 meters and outdoor positioning precision can reach 10 meters, which can meet only some low-precision application requirements.

3. Access Network Device

The access network device is a node or a device that connects a terminal device to a radio network, and the access network device may also be referred to as a base station. For example, the access network device includes but is not limited to: a new generation NodeB (generation NodeB, gNB) in a 5G communication system, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station ((home evolved NodeB, HeNB), or (home NodeB, HNB)), a baseband unit (baseband unit, BBU), a transmitting and receiving point (transmitting and receiving point, TRP), a transmitting point (transmitting point, TP), a mobile switching center, a satellite, or a base station in a future communication system. In addition, the access network device may further include a central unit (central unit, CU), a distribution unit (distributed unit, DU), and the like that are integrated into the gNB. This is not limited herein.

In embodiments of this application, an apparatus configured to implement a function of the access network device may be an access network device, or may be an apparatus that can support the access network device in implementing the function, for example, a chip system, or a combined component or part that can implement the function of the access network device. The apparatus may be installed in the access network device. In the technical solutions provided in embodiments of this application, the technical solutions provided in embodiments of this application are described by using an example in which the apparatus configured to implement the function of the access network device is the access network device.

An interface between the access network device and the terminal device may be a Uu interface (or referred to as an air interface). Certainly, in future communication, names of these interfaces may remain unchanged, or may be replaced with other names. This is not limited in this application. For example, communication between the access network device and the terminal device is performed in accordance with a specific protocol layer structure. For example, a control-plane protocol layer structure may include a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user-plane protocol layer structure may include a PDCP layer, an RLC layer, a MAC layer, and a physical layer. In a possible implementation, a service data adaptation protocol (service data adaptation protocol, SDAP) layer may be further included above the PDCP layer.

In embodiments of this application, an access network device in the UWB positioning system may be referred to as a UWB access network device, and an access network device in the wireless cellular network positioning system may be referred to as a cellular-network access network device.

The terminal device in embodiments of this application may also be referred to as a terminal, a tag, user equipment (user equipment, UE), a mobile station (mobile station, MS), a mobile terminal (mobile terminal, MT), or the like. The terminal device may be an entity, such as a mobile phone, configured to receive or transmit a signal on a user side. The terminal device may be deployed on land, including indoor, outdoor, handheld, or in-vehicle, or may be deployed on a water surface (for example, on a ship), or may be deployed in the air (for example, on an airplane, a balloon, or a satellite). The UE includes a handheld device, an in-vehicle device, a wearable device, or a computing device that has a wireless communication function. For example, the UE may be a mobile phone (mobile phone), a tablet computer, or a computer having a wireless receiving/sending function. Alternatively, the terminal device may be a virtual reality (virtual reality, VR) terminal device, an augmented reality (augmented reality, AR) terminal device, a wireless terminal in industrial control, a wireless terminal in self-driving, a wireless terminal in remote medical, a wireless terminal in a smart grid, a wireless terminal in a smart city (smart city), a wireless terminal in a smart home (smart home), or the like.

The following describes a basic architecture of a positioning system provided in an embodiment of this application.

FIG. 1 is a schematic diagram of a structure of a positioning system according to an embodiment of this application. The positioning system may include at least one radio over fiber (radio over fiber, RoF) device and at least one access network device. Generally, a quantity of access network devices in the positioning system may be determined based on an actual application scenario. This is not limited herein. For example, if one-dimensional positioning is performed on a tag (or referred to as a terminal device), the positioning system may include at least two (that is, greater than or equal to 2) access network devices. If two-dimensional positioning is performed on a tag (or referred to as a terminal device), the positioning system may include at least three (that is, greater than or equal to 3) access network devices. If three-dimensional positioning is performed on a tag (or referred to as a terminal device), the positioning system may include at least four (that is, greater than or equal to 4) access network devices. For ease of description, in this embodiment of this application, an example in which three-dimensional positioning is performed on a tag and four access network devices are included is used for description. As shown in FIG. 1, one RoF device and four access network devices (for example, an access network device 1, an access network device 2, an access network device 3, and an access network device 4 in FIG. 1) are used as an example for description. The RoF device may be separately connected to the access network device 1, the access network device 2, the access network device 3, and the access network device 4 by using an optical fiber. The RoF device is configured to generate a combined optical signal, and send the combined optical signal to each access network device by using the optical fiber.

A wireless positioning method in the positioning system in this embodiment of this application includes a ranging-based wireless positioning method, which mainly includes a time difference of arrival (time difference of arrival, TDOA) wireless positioning method, a time of arrival (time of arrival, TOA) wireless positioning method, and the like. This is not limited herein. In the TDOA-based wireless positioning method, location coordinates of a to-be-measured target node are estimated by measuring a signal flight time difference between the to-be-measured target node and positioning base stations. Therefore, strict clock synchronization needs to be maintained between the positioning base stations.

Generally, clock synchronization may be understood as synchronization between clock time (time for short) and clock frequencies (frequencies for short). Currently, each positioning base station in a UWB system and a wireless cellular network system usually uses a crystal oscillator inside the positioning base station to generate an oscillation frequency, and after the oscillation frequency is multiplied to a high frequency by using a phase-locked loop, the oscillation frequency is used as a clock frequency of the base station, to maintain frequency synchronization between the positioning base stations. However, individual differences exist between crystal oscillators in a manufacturing process. Therefore, even if crystal oscillators used by the positioning base stations have a same specification, an error may exist between frequencies of the positioning base stations in actual operation, and high-precision clock synchronization cannot be ensured.

Based on this, an embodiment of this application provides a clock frequency determining method. The method can improve clock synchronization precision.

It may be understood that, in this embodiment of this application, when the positioning system is a UWB positioning system, an access network device in the UWB positioning system is a UWB access network device. For example, FIG. 2 is a schematic diagram of another structure of a positioning system according to an embodiment of this application. As shown in FIG. 2, a UWB positioning system includes one RoF device and four UWB access network devices (for example, a UWB access network device 1, a UWB access network device 2, a UWB access network device 3, and a UWB access network device 4 in FIG. 2). The RoF device may be separately connected to the UWB access network device 1, the UWB access network device 2, the UWB access network device 3, and the UWB access network device 4 by using an optical fiber. The RoF device is configured to generate a combined optical signal, and send the combined optical signal to each UWB access network device by using the optical fiber.

When the positioning system is a wireless cellular network positioning system, an access network device in the wireless cellular network positioning system is a cellular-network access network device. For example, FIG. 3 is a schematic diagram of another structure of a positioning system according to an embodiment of this application. As shown in FIG. 3, the cellular network positioning system includes one RoF device and four cellular-network access network devices (for example, a cellular-network access network device 1, a cellular-network access network device 2, a cellular-network access network device 3, and a cellular-network access network device 4 in FIG. 3). The RoF device may be separately connected to the cellular-network access network device 1, the cellular-network access network device 2, the cellular-network access network device 3, and the cellular-network access network device 4 by using an optical fiber. The RoF device is configured to generate a combined optical signal, and send the combined optical signal to each cellular-network access network device by using the optical fiber.

In other words, the access network device in embodiments of this application may be a cellular-network access network device, an ultra-wideband access network device, or the like. This is not limited herein. For ease of description, the UWB access network device and the cellular-network access network device are collectively referred to as an access network device for description in embodiments of this application.

Figure 4:
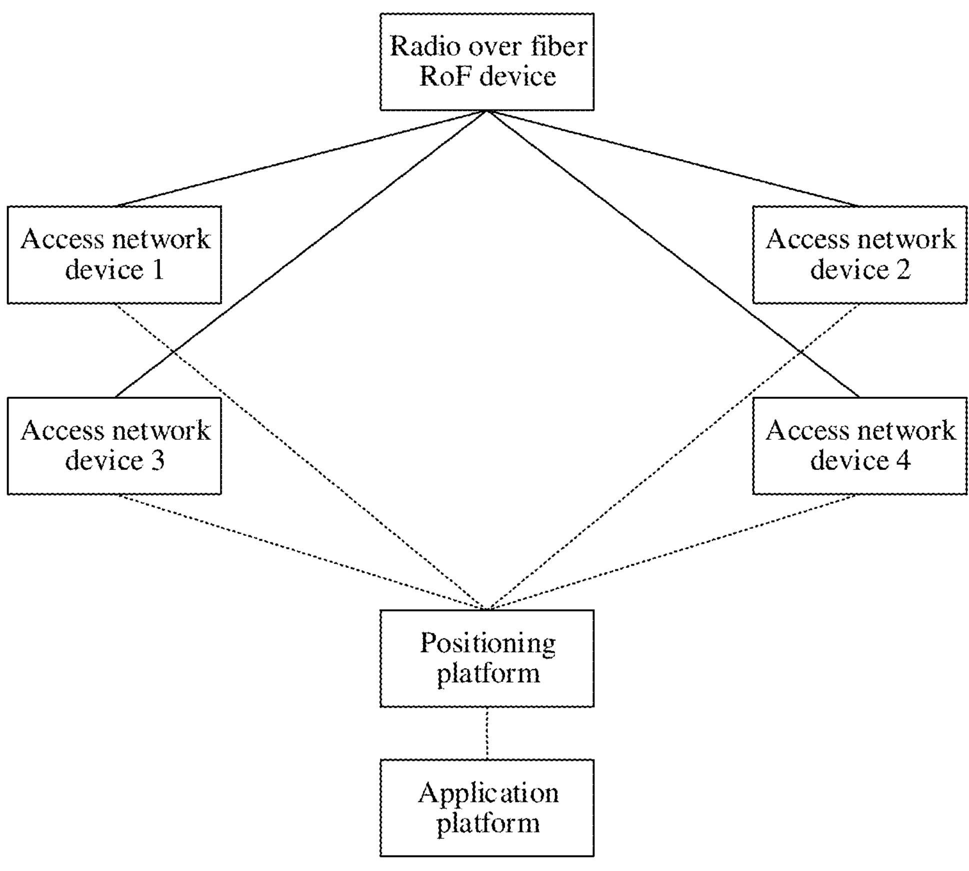
FIG. 4 is a schematic diagram of another structure of a positioning system according to an embodiment of this application.

Optionally, the positioning system may further include a positioning platform and/or an application platform. For example, FIG. 4 is a schematic diagram of another structure of a positioning system according to an embodiment of this application. As shown in FIG. 4, the access network device may be connected to the positioning platform in a wired or wireless manner, and the positioning platform may be connected to the application platform in a wired or wireless manner. Specifically, after each access network device in the positioning system receives a positioning signal from a tag, the access network device may record a receiving timestamp at which the positioning signal is received, and send the positioning signal and the receiving timestamp together to the positioning platform. Therefore, the positioning platform may determine, in combination with a positioning algorithm, location coordinates of the tag based on the positioning signal and the receiving timestamp that are sent by each access network device. Optionally, the positioning platform may further send the determined location coordinates of the tag to the application platform, to provide functions such as navigation based on the application platform. Optionally, the positioning system may further include a tag (that is, a terminal device) and the like. This is not limited herein.

Figure 5:
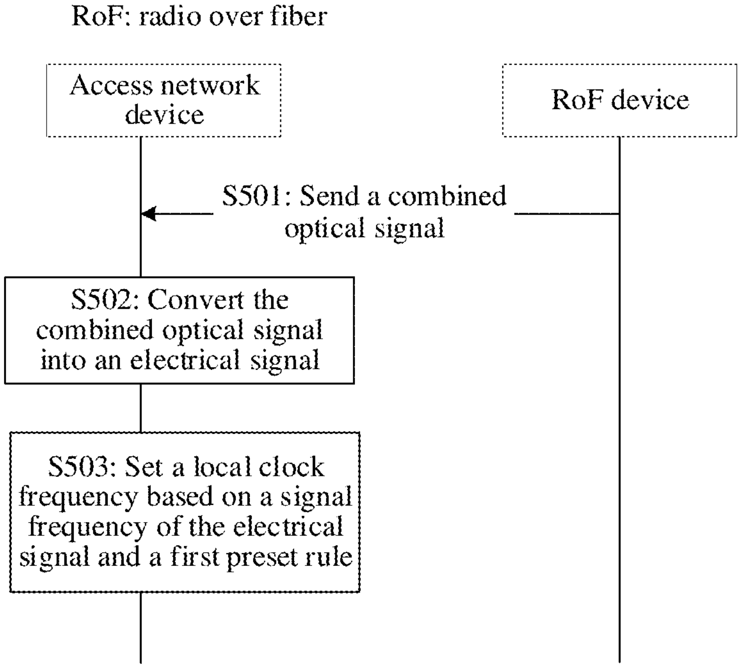
FIG. 5 is a schematic flowchart of a clock frequency determining method according to an embodiment of this application.

FIG. 5 is a schematic flowchart of a clock frequency determining method according to an embodiment of this application. As shown in FIG. 5, the clock frequency determining method includes the following step S501 to step S503. The method shown in FIG. 5 may be performed by an access network device, or the method shown in FIG. 5 may be performed by a chip in an access network device. The access network device may be a UWB access network device, a cellular-network access network device, or the like. This is not limited herein. For ease of description, an example in which the access network device is the execution body is used for description in FIG. 5.

S501: The access network device receives a combined optical signal from a radio over fiber RoF device.

In some feasible implementations, the RoF device may generate the combined optical signal by coupling an optical signal of a first frequency and an optical signal of a second frequency. Specifically, the RoF device may include a first laser, a second laser, a laser combiner, and the like. Output ends of the first laser and the second laser are connected to an input end of the laser combiner by using an optical fiber. The generating the combined optical signal may be understood as: generating a first optical signal of the first frequency by using the first laser of a first wavelength; generating a second optical signal of the second frequency by using the second laser of a second wavelength; and coupling the first optical signal and the second optical signal by using the laser combiner to obtain the combined optical signal. The first wavelength and the second wavelength may be wavelengths used for fiber-optic communication. For example, the first wavelength and the second beam may range from 980 nm to 1550 nm. This is not limited herein. It may be understood that, the combined optical signal obtained through coupling is an optical signal including two frequencies (that is, the first frequency and the second frequency).

For example, the first wavelength is 1000.1 nm, and the second wavelength is 1000.5 nm. The first laser of the first wavelength may generate a first optical signal whose first frequency is about 299.7624817 THz, and the second laser of the second wavelength may generate a second optical signal whose second frequency is about 299.6426366816 THz. The wavelength and the frequency meet: frequency=speed of light/wavelength, where the speed of light is 299792458 m/s. Therefore, the combined optical signal obtained through coupling based on the first optical signal and the second optical signal may include an optical signal whose first frequency is about 299.7624817 THz and whose second frequency is about 299.6426366816 THz.

Optionally, in addition to the first laser, the second laser, and the laser combiner, the RoF device may further include a splitter. An output end of the laser combiner may be connected to an input end of the splitter by using an optical fiber, so that the splitter may convert, into at least two combined optical signals, the combined optical signal obtained through coupling based on the laser combiner. Each of the at least two combined optical signals includes optical signals of two frequencies (that is, the first frequency and the second frequency). Therefore, the RoF device may send the combined optical signal obtained through coupling. Correspondingly, the access network device may receive the combined optical signal from the RoF device.

S502: The access network device converts the combined optical signal into an electrical signal.

In some feasible implementations, after the access network device receives the combined optical signal from the RoF device, the access network device may convert the combined optical signal into the electrical signal. In this embodiment of this application, the access network device may convert the combined optical signal into the electrical signal by using an optical-to-electrical converter inside (or described as "built-in") the access network device (that is, the access network device itself). Optionally, the access network device may convert the combined optical signal into the electrical signal based on an external optical-to-electrical converter (or described as an externally connected optical-to-electrical converter) connected to the access network device. This is not limited herein. For ease of understanding, this embodiment of this application is described by using an example in which the access network device converts the combined optical signal into the electrical signal based on a built-in/embedded optical-to-electrical converter.

Figure 6:
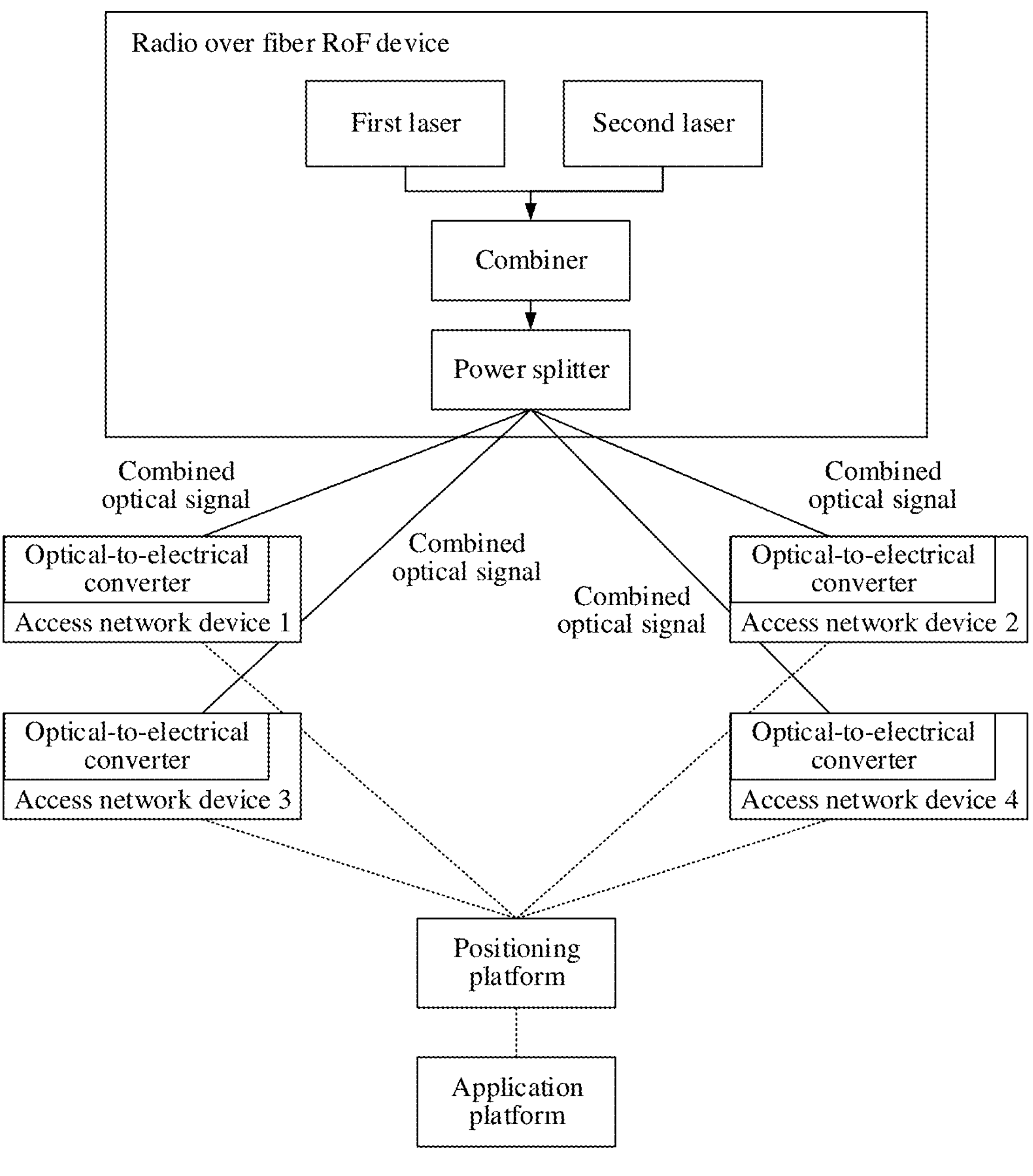
FIG. 6 is a schematic diagram of another structure of a positioning system according to an embodiment of this application.

For example, FIG. 6 is a schematic diagram of another structure of a positioning system according to an embodiment of this application. As shown in FIG. 6, the positioning system includes a RoF device, four access network devices, a positioning platform, and an application platform. The RoF device includes a first laser, a second laser, a combiner, and a power splitter. Each access network device includes an optical-to-electrical converter. The RoF device may be connected to each access network device by using an optical fiber, to send a generated combined optical signal to each access network device. After receiving the combined optical signal, each access network device may convert the combined optical signal into an electrical signal based on the optical-to-electrical converter in the access network device, to set a local clock frequency of the access network device based on a signal frequency of the electrical signal obtained through conversion. Each access network device may be connected to the positioning platform in a wired or wireless manner, to send a related parameter for positioning to the positioning platform in a wired or wireless manner. For example, the positioning parameter may be a positioning signal and a receiving timestamp that are sent by a terminal device. The positioning platform may also be connected to the application platform in a wired or wireless manner, to send, to the application platform in a wired or wireless manner, location coordinate information that is of the terminal device and that is determined by the positioning platform based on a positioning algorithm, so that the application platform can further provide application services such as navigation for a holder of the terminal device based on the received location coordinate information.

S503: The access network device sets a local clock frequency based on a signal frequency of the electrical signal and a first preset rule.

In some feasible implementations, the access network device may set the local clock frequency based on the signal frequency of the electrical signal obtained through conversion and the first preset rule. The signal frequency of the electrical signal is equal to an absolute value of a frequency difference between the first frequency and the second frequency. For example, the first frequency is 299.7624817 THz and the second frequency is 299.6426366816 THz. Therefore, the signal frequency of the electrical signal is 119.8450184 GHz. The first preset rule may include: the local clock frequency is the signal frequency of the electrical signal. In other words, the access network device may set the signal frequency of the electrical signal as the local clock frequency. Optionally, the first preset rule may further include: the local clock frequency meets: $f_0=f_1/N$, where $f_0$ represents the local clock frequency, $f_1$ represents the signal frequency of the electrical signal, and N is an integer greater than 1. In other words, the access network device may set the signal frequency of the electrical signal as the local clock frequency after frequency reduction (or sampling).

The absolute value of the frequency difference between the first frequency and the second frequency is not less than a preset threshold. For example, the preset threshold may be 63.8976 GHz, or the preset threshold may be a frequency greater than 63.8976 GHz, or the preset threshold may be a frequency less than 63.8976 GHz. This is not limited herein. It may be understood that, because a maximum frequency that can be provided in a current solution based on a crystal oscillator is 63.8976 GHz, to implement clock frequency synchronization with higher precision in this application compared with the solution based on the crystal oscillator, the preset threshold recommended in this application is a frequency greater than or equal to 63.8976 GHz.

Optionally, in some feasible implementations, the access network device may further synchronize local clock time with clock time of another access network device in a positioning system in which the access network device is located. Further, after the local clock frequency and the local clock time are synchronized with a clock frequency and the clock time of the another access network device in the positioning system, a positioning signal from a terminal device is received, and a receiving timestamp at which the positioning signal is received is determined. Further, the positioning signal and the receiving timestamp are sent to a positioning platform, where the positioning signal and the receiving timestamp are used to determine a location of the terminal device.

An example in which the positioning system in which the access network device is located in this embodiment of this application includes four access network devices is used for description. The four access network devices are respectively an access network device 1, an access network device 2, an access network device 3, and an access network device 4. It is assumed that the access network device in this application is the access network device 1. Therefore, that the access network device (that is, the access network device 1) synchronizes local clock time of the access network device (that is, the access network device 1) with clock time of another access network device (that is, the access network device 2, the access network device 3, and the access network device 4) in a positioning system in which the access network device (that is, the access network device 1) is located may be understood as follows: Clock time of a specific access network device is used as a reference (that is, a reference access network device is determined), and clock time of another access network device maintains consistent with the clock time of the reference access network device. Specifically, it is assumed that the reference access network device is the access network device 1. Therefore, the reference access network device may send a first message to another access network device (that is, the access network devices 2/3/4). The first message includes sending timestamp information TS1 and coordinate information (it is assumed that the coordinate information is three-dimensional coordinate information: x_base, y_base, and z_base) of the reference access network device. After receiving the first message, each of the access network devices 2/3/4 may record receiving timestamp information TSi (that is, a clock timer value) generated when the first message is received, and parse the first message to obtain the sending timestamp information TS1 of the reference access network device and the coordinate information of the reference access network device. Therefore, each of the access network devices 2/3/4 may calculate a time offset ΔTSi between the access network device and the reference access network device based on the receiving timestamp information TSi, coordinate information (xi, yi, and zi) of the access network device, the coordinate information (x_base, y_base, and z_base) of the reference access network device, and the sending timestamp TS1 of the reference access network device. Further, each of the access network devices 2/3/4 may correct a clock of the access network device based on ΔTSi, thereby ensuring clock time synchronization with the reference access network device. A formula for calculating the time offset ΔTSi meets:

$$\Delta TS_i = \frac{F * \sqrt{(xi - \text{x\_base})^2 + (yi - \text{y\_base})^2 + (zi - \text{z\_base})^2}}{V} + TS1 - TSi$$

F represents a clock frequency of the access network device, V represents a speed of light, TS1 represents the sending timestamp information of the reference access network device, and TSi represents the receiving timestamp information.

Clock time synchronization between the access network devices in the positioning system may be clock time synchronization performed only once during initialization. The initialization of the access network device may include one or more of the following cases: The access network devices in the positioning system are started for the first time, or any access network device in the positioning system is restarted, or a new access network device joins the positioning system. This is not limited herein. Optionally, clock time synchronization between the access network devices in the positioning system may alternatively be periodic clock time synchronization, to be specific, clock time synchronization is performed by using preset duration as a synchronization periodicity, or clock time synchronization is performed at intervals of preset duration. The synchronization periodicity in this embodiment of this application may be configured on a side of the reference access network device. For example, the synchronization periodicity may be configured as a value of a minute magnitude (for example, the synchronization periodicity may be configured as 1 minute, 5 minutes, 10 minutes, or 30 minutes), or may even be configured as a value of an hour magnitude (for example, the synchronization periodicity may be configured as 1 hour). This is specifically determined based on an actual application scenario, and is not limited herein. It may be understood that, in this embodiment of this application, clock frequencies of the access devices are set based on a signal frequency of an electrical signal converted from a same combined optical signal. Therefore, the clock frequencies of the access network devices may be highly consistent, and no clock drift occurs in a short time. Compared with the conventional technology in which a clock synchronization operation needs to be frequently performed (that is, the synchronization periodicity needs to be set to have a magnitude of hundreds of milliseconds) because high-precision synchronization between clock frequencies cannot be maintained, the synchronization periodicity in this embodiment of this application may be set to be longer. In other words, in this embodiment of this application, a unified photoelectric signal is externally provided for the clock frequencies of the access network devices, and optical-to-electrical conversion is performed only once in each access network device to generate a high-frequency electrical signal for clock counting. Therefore, the clock frequencies of the access network devices are highly consistent. In this way, high-precision frequency and time synchronization between the access network devices can be ensured without frequent clock time synchronization, thereby greatly reducing a quantity of synchronization times, and further reducing message receiving and sending (for example, receiving and sending of the first message used for clock time synchronization) between the access network devices to reduce power consumption of the access network devices.

After the local clock frequency and the local clock time of the access network device 1 are synchronized with the clock frequency and the clock time of the another access network device (that is, the access network devices 2/3/4) in the positioning system, each access network device in the positioning system may receive a positioning signal from a positioning tag (or described as the terminal device), and determine a receiving timestamp at which the positioning signal is received. Further, each access network device may send information such as the positioning signal and the receiving timestamp to the positioning platform, so that the positioning platform can determine the location of the terminal device based on the received positioning signal and receiving timestamp that are sent by each access network device.

It may be understood that, in the positioning phase, the terminal device may actively send the positioning signal to the access network device for coordinate positioning of the terminal device. For example, the terminal device may periodically send the positioning signal to the access network device for coordinate positioning of the terminal device. Optionally, the access network device (for example, the reference access network device) in the positioning system may send a request message to the terminal device, to trigger the terminal device to send the positioning signal to the access network device for coordinate positioning of the terminal device. For example, the reference access network device may periodically send the request message to the terminal device, to trigger the terminal device to send the positioning signal for coordinate positioning. This may be specifically determined based on an actual application scenario, and is not limited herein.

After the positioning platform receives the positioning signal and the receiving timestamp that are sent by each access network device, the positioning platform may perform coordinate positioning by using the positioning algorithm. Specifically, in this embodiment of this application, an example in which the positioning system in which the access network device is located includes four access network devices (that is, access network devices 1/2/3/4) is used to describe the positioning algorithm in this embodiment of this application.

The terminal device sends the positioning signal, and the access network devices 1/2/3/4 receive the positioning signal sent by the terminal device. Because distances between the terminal device and the access network devices are different, receiving timestamps at which the access network devices receive the positioning signal sent by the terminal device are also different. For ease of description, in this embodiment of this application, a receiving timestamp of the access network device 1 is recorded as Time1, a receiving timestamp of the access network device 2 is recorded as Time2, a receiving timestamp of the access network device 3 is recorded as Time3, and a receiving timestamp of the access network device 4 is recorded as Time4. Coordinates of the access network device 1 are (x1, y1, z1), coordinates of the access network device 2 are (x2, y2, z2), coordinates of the access network device 3 are (x3, y3, z3), coordinates of the access network device 4 are (x4, y4, z4), and coordinates of the terminal device are (x, y, z). The distances between the terminal device and the access network devices are respectively:

a distance between the access network device 1 and the terminal device is:

$$D1=\sqrt{(x1-x)^2+(y1-y)^2+(z1-z)^2} \tag{1}$$

a distance between the access network device 2 and the terminal device is:

$$D2=\sqrt{(x2-x)^2+(y2-y)^2+(z2-z)^2} \tag{2}$$

a distance between the access network device 3 and the terminal device is:

$$D3=\sqrt{(x3-x)^2+(y3-y)^2+(z3-z)^2} \tag{3}$$

a distance between the access network device 4 and the terminal device is:

$$D4=\sqrt{(x4-x)^2+(y4-y)^2+(z4-z)^2} \tag{4}$$

Di represents a distance between an access network device i and the terminal device, and i=1, 2, 3, or 4.

The foregoing four formulas (that is, the formula (1) to the formula (4)) may be converted into distance difference formulas (for example, converted into subtraction between the formula 1 and other formulas), which are specifically as follows:

$$D2-D1=\sqrt{(x3-x)^2+(y3-y)^2+(z3-z)^2}-\sqrt{(x1-x)^2+(y1-y)^2+(z1-z)^2} \tag{5}$$

$$D3-D1=\sqrt{(x3-x)^2+(y3-y)^2+(z3-z)^2}-\sqrt{(x1-x)^2+(y1-y)^2+(z1-z)^2} \tag{6}$$

$$D4-D1=\sqrt{(x4-x)^2+(y4-y)^2+(z4-z)^2}-\sqrt{(x1-x)^2+(y1-y)^2+(z1-z)^2} \tag{7}$$

Further, for distance differences in the foregoing formulas (that is, the formula (5) to formula (7)), the distance differences may be further represented by time through conversion, which is specifically as follows:

$$(\mathrm{Time2}-\mathrm{Time1})*V=\sqrt{(x3-x)^2+(y3-y)^2+(z3-z)^2}-\sqrt{(x1-x)^2+(y1-y)^2+(z1-z)^2} \tag{8}$$

$$(\mathrm{Time3}-\mathrm{Time1})*V=\sqrt{(x3-x)^2+(y3-y)^2+(z3-z)^2}-\sqrt{(x1-x)^2+(y1-y)^2+(z1-z)^2} \tag{9}$$

$$(\mathrm{Time4}-\mathrm{Time1})*V=\sqrt{(x4-x)^2+(y4-y)^2+(z4-z)^2}-\sqrt{(x1-x)^2+(y1-y)^2+(z1-z)^2} \tag{10}$$

V represents a speed of light. For the foregoing formula 8 to formula 10, the speed of light V, the receiving timestamps Time1, Time2, Time3, and Time4, and the coordinates (xi, yi, zi) (that is, (x1, y1, z1), (x2, y2, z2), (x3, y3, z3), and (x4, y4, z4)) of the four access network devices all are known. Therefore, the coordinates (x, y, z) of the terminal device may be determined by solving x, y, and z in the formula 8 to the formula 10.

In some feasible implementations, after the coordinate location information of the terminal device is determined based on the positioning platform, the positioning platform may further send the determined coordinate location information to an application platform, to provide functions such as navigation, self-driving, and assisted driving based on the application platform. This is not limited herein.

It may be understood that, the access network device in this embodiment of this application may be a UWB access network device (that is, an access network device in a UWB positioning system), or may be a cellular-network access network device (that is, an access network device in a cellular network positioning system). In other words, this embodiment of this application may be performed by a UWB access network device, or may be performed by a cellular-network access network device. When the access network device is the UWB access network device, the UWB access network device may be further integrated with the cellular-network access network device, that is, the UWB positioning system is integrated with the cellular network system to position the coordinates of the terminal device (or described as a tag).

Figure 7:
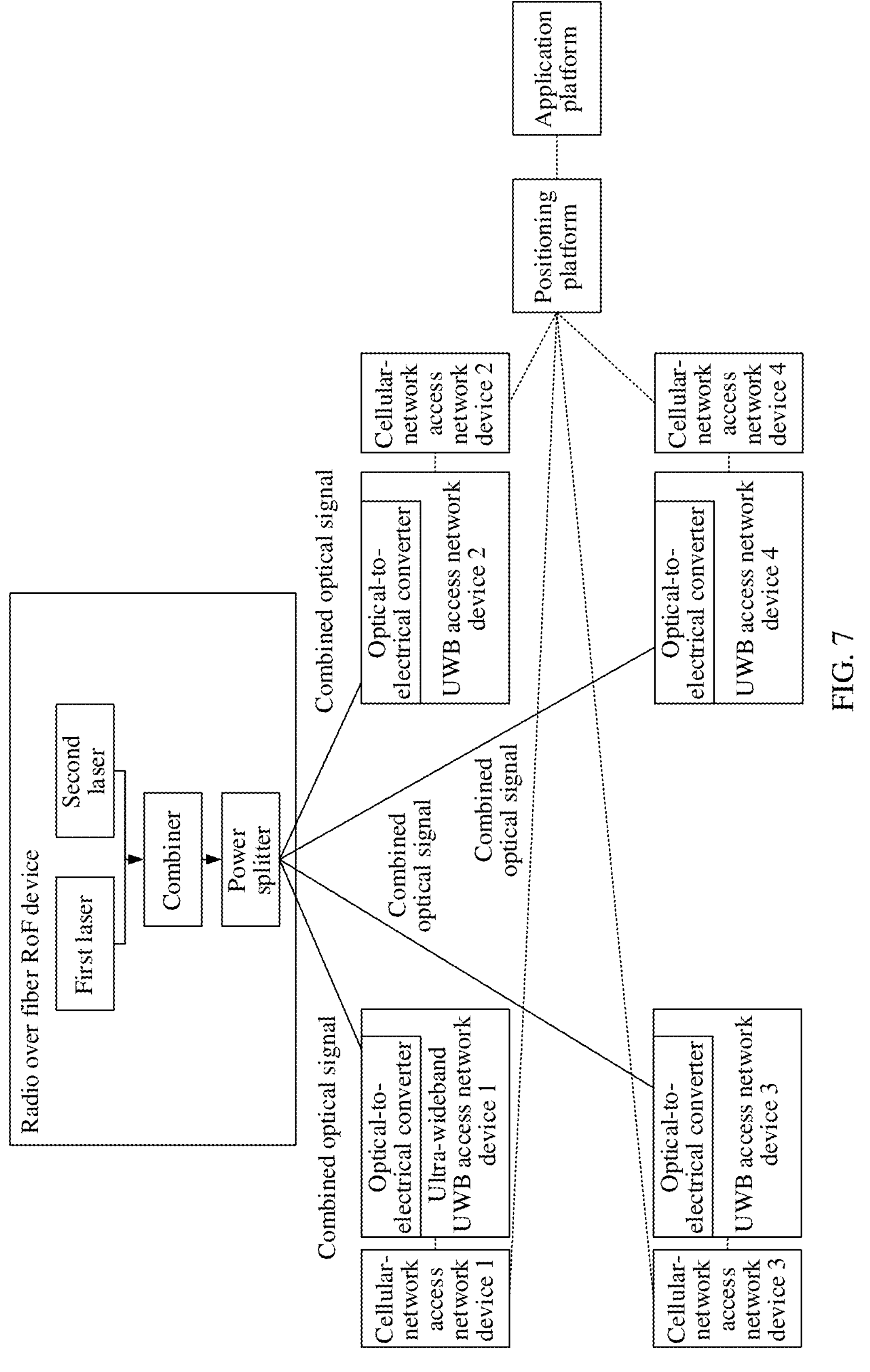
FIG. 7 is a schematic diagram of another structure of a positioning system according to an embodiment of this application.

For example, FIG. 7 is a schematic diagram of another structure of a positioning system according to an embodiment of this application. As shown in FIG. 7, the positioning system includes a RoF device, four UWB access network devices, four cellular-network access network devices, a positioning platform, and an application platform. The RoF device includes a first laser, a second laser, a combiner, and a power splitter. Each UWB access network device includes an optical-to-electrical converter. The RoF device may be connected to each UWB access network device by using an optical fiber, to send a generated combined optical signal to the UWB access network device. After receiving the combined optical signal, each UWB access network device may convert the combined optical signal into an electrical signal based on the optical-to-electrical converter in the UWB access network device, to set a local clock frequency of the UWB access network device based on a signal frequency of the electrical signal obtained through conversion. Each UWB access network device may be connected to each cellular-network access network device in a wired or wireless manner (as shown in FIG. 7, a UWB access network device 1 is connected to a cellular-network access network device 1, a UWB access network device 2 is connected to a cellular-network access network device 2, a UWB access network device 3 is connected to a cellular-network access network device 3, and a UWB access network device 4 is connected to a cellular-network access network device 4). Each cellular-network access network device is connected to the positioning platform in a wired or wireless manner. Further, the UWB access network device may forward, to the positioning platform by using the cellular-network access network device, a positioning signal received by the UWB access network device and a recorded receiving timestamp, to send a positioning-related parameter to the positioning platform in a wired or wireless manner. For example, the positioning parameter may be a positioning signal and a receiving timestamp that are sent by a terminal device. The positioning platform may also further be connected to the application platform in a wired or wireless manner, to send, to the application platform in a wired or wireless manner, location coordinate information that is of the terminal device and that is determined by the positioning platform based on a positioning algorithm, so that the application platform can further provide application services such as navigation for a holder of the terminal device based on the received location coordinate information. It may be understood that, when indoor cellular-network access network devices perform clock synchronization, the indoor cellular-network access network devices perform clock time synchronization by using a satellite signal, and use crystal oscillators of a same specification to generate oscillation frequencies to perform clock frequency synchronization. Because indoor signal reception is weak due to an indoor obstacle and the oscillation frequencies generated by the crystal oscillators are different, clock synchronization precision is greatly reduced, and positioning precision of the terminal device is low. Based on this, in this application, the UWB access network device is externally connected to the indoor cellular-network access network device, to assist a cellular network in improving precision of positioning a terminal, and ensure application in a future 5G/6G indoor scenario.

In this embodiment of this application, the access network devices use a unified external reference clock (that is, a clock frequency determined based on the signal frequency of the electrical signal converted from the combined optical signal provided by the RoF device), so that clock frequencies of the access network devices are highly consistent, and no clock drift and asynchronization occur in a short time. In addition, a high-frequency clock (for example, a clock frequency greater than 63.8976 GHz) can be generated based on the RoF device. Therefore, compared with a maximum clock frequency of 63.8976 GHz that can be currently provided by using a crystal oscillator, in this embodiment of this application, clock resolution (the clock resolution is equal to the reciprocal of the clock frequency) can be improved, thereby improving clock synchronization precision (the clock synchronization precision is equal to a product of the clock resolution and a speed of light). The clock synchronization precision directly affects tag positioning precision, and therefore, tag positioning precision can be further improved.

For example, in this application, the first frequency is 299.7624817 THz and the second frequency is 299.6426366816 THz. Therefore, the signal frequency of the electrical signal is 119.8450184 GHz. If the first preset rule is setting the signal frequency of the electrical signal as the clock frequency, when the signal frequency of the electrical signal is 119.8450184 GHz, the clock frequency is also 119.8450184 GHz. Therefore, the clock resolution is 1/119.8450184 GHz, that is, approximately equal to 8.344 picoseconds, and the clock synchronization precision is 1/119.8450184 GHz*speed of light, that is, approximately equal to 2.5 millimeters. For a solution in which a clock frequency is provided based on a crystal oscillator, a maximum frequency that can be provided by the crystal oscillator is 63.8976 GHz. Therefore, the clock resolution is 1/63.8976 GHz, that is, approximately equal to 15.65 picoseconds, and the clock synchronization precision is 1/63.8976 GHz*speed of light, that is, approximately equal to 4.6 millimeters. It may be learned that, compared with that the clock synchronization precision in the solution based on the crystal oscillator can reach 4.6 millimeters, the clock synchronization precision in the solution provided in this embodiment of this application can reach 2.5 millimeters. Apparently, because 2.5 millimeters<4.6 millimeters, the clock synchronization precision in this application is higher.

Communication apparatuses provided in this application are described below in detail with reference to FIG. 8 to FIG. 9.

Figure 8:
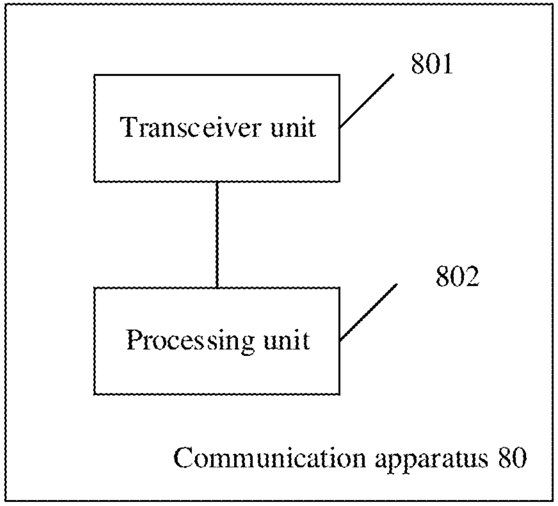
FIG. 8 is a schematic diagram of a structure of a communication apparatus according to an embodiment of this application.

FIG. 8 is a schematic diagram of a structure of a communication apparatus according to an embodiment of this application. The communication apparatus 80 shown in FIG. 8 may be configured to perform some or all functions of the access network device in the method embodiment described in FIG. 5. The apparatus may be an access network device, an apparatus in an access network device, or an apparatus that can be used together with an access network device. The communication apparatus may alternatively be a chip system. The communication apparatus shown in FIG. 8 may include a transceiver unit 801 and a processing unit 802. The processing unit 802 is configured to perform data processing. The transceiver unit 801 is integrated with a receiving unit and a sending unit. The transceiver unit 801 may also be referred to as a communication unit. Alternatively, the transceiver unit 801 may be split into a receiving unit and a sending unit. The processing unit 802 and the transceiver unit 801 below are similar to those described herein, and details are not described below again.

In an implementation, the transceiver unit 801 is configured to receive a combined optical signal from a radio over fiber RoF device, where the combined optical signal is obtained by coupling an optical signal of a first frequency and an optical signal of a second frequency; the processing unit 802 is configured to convert the combined optical signal into an electrical signal; and the processing unit 802 is further configured to set a local clock frequency based on a signal frequency of the electrical signal and a first preset rule, where the signal frequency of the electrical signal is equal to an absolute value of a frequency difference between the first frequency and the second frequency.

For another possible implementation of the communication apparatus, refer to related descriptions of functions of the access network device in the method embodiment corresponding to FIG. 5. Details are not described herein again.

Refer to FIG. 8 again. FIG. 8 is a schematic diagram of a structure of a communication apparatus according to an embodiment of this application. The communication apparatus shown in FIG. 8 may be configured to perform some or all functions of the RoF device in the method embodiment described in FIG. 5. The apparatus may be a RoF device, an apparatus in a RoF device, or an apparatus that can be used together with a RoF device. The communication apparatus may alternatively be a chip system. The communication apparatus shown in FIG. 8 may include a transceiver unit 801 and a processing unit 802.

In an implementation, the processing unit 802 is configured to generate a combined optical signal, where the combined optical signal is obtained by coupling an optical signal of a first frequency and an optical signal of a second frequency, and an absolute value of a frequency difference between the first frequency and the second frequency is used to determine a clock frequency of a positioning system in which the RoF device is located; and the transceiver unit 801 is configured to send the combined optical signal.

For another possible implementation of the communication apparatus, refer to related descriptions of functions of the RoF device in the method embodiment corresponding to FIG. 5. Details are not described herein again.

Figure 9:
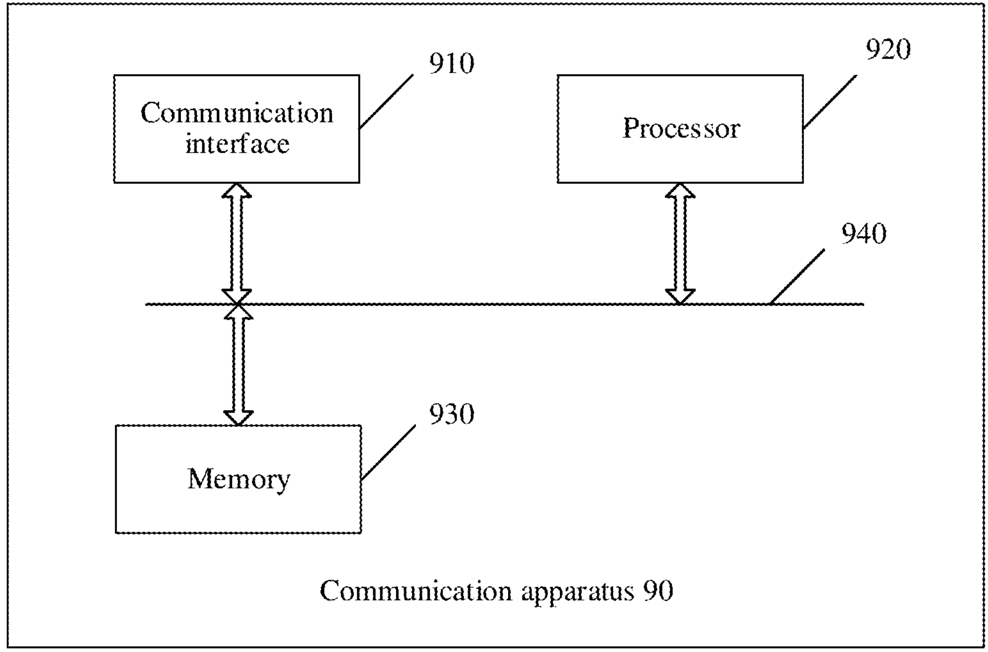
FIG. 9 is a schematic diagram of a structure of another communication apparatus according to an embodiment of this application.

FIG. 9 is a schematic diagram of a structure of another communication apparatus according to an embodiment of this application. FIG. 9 shows a communication apparatus 90 according to an embodiment of this application. The communication apparatus 90 is configured to implement functions of the access network device in FIG. 5. The apparatus may be an access network device or an apparatus used in an access network device. The apparatus used in the access network device may be a chip system or a chip in the access network device. The chip system may include a chip, or may include a chip and another discrete component.

Alternatively, the communication apparatus 90 is configured to implement functions of the RoF device in FIG. 5. The apparatus may be a RoF device or an apparatus used in a RoF device. The apparatus used in the RoF device may be a chip system or a chip in the RoF device. The chip system may include a chip, or may include a chip and another discrete component.

The communication apparatus 90 includes at least one processor 920, configured to implement a data processing function of the access network device or the RoF device in the method provided in embodiments of this application. The apparatus 90 may further include a communication interface 910, configured to implement receiving and sending operations of the access network device or the RoF device in the method provided in embodiments of this application. In this embodiment of this application, the communication interface may be a transceiver, a circuit, a bus, a module, or a communication interface of another type, and is configured to communicate with another device through a transmission medium. For example, the communication interface 910 is used by an apparatus in the apparatus 90 to communicate with another device. The processor 920 receives and sends data by using the communication interface 910, and is configured to implement the method in FIG. 5 in the foregoing method embodiment.

Specifically, when the communication apparatus 90 is a RoF device, the processor 920 may alternatively be a processor including a laser, a combiner, and a power splitter, and the processor is configured to generate a plurality of combined optical signals.

The apparatus 90 may further include at least one memory 930, configured to store program instructions and/or data. The memory 930 is coupled to the processor 920. The coupling in this embodiment of this application may be an indirect coupling or a communication connection between apparatuses, units, or modules in an electrical form, a mechanical form, or another form, and is used for information exchange between the apparatuses, the units, or the modules. The processor 920 may operate in collaboration with the memory 930. The processor 920 may execute the program instructions stored in the memory 930. At least one of the at least one memory may be included in the processor.

After the apparatus 90 is powered on, the processor 920 may read a software program in the memory 930, interpret and execute instructions in the software program, and process data in the software program. When data needs to be sent wirelessly, the processor 920 performs baseband processing on the to-be-sent data, and then outputs a baseband signal to a radio frequency circuit (not shown in the figure). The radio frequency circuit performs radio frequency processing on the baseband signal, and then sends a radio frequency signal in a form of an electromagnetic wave by using an antenna. When data is sent to the apparatus 90, the radio frequency circuit receives a radio frequency signal by using the antenna, converts the radio frequency signal into a baseband signal, and outputs the baseband signal to the processor 920; and the processor 920 converts the baseband signal into data and processes the data.

In another implementation, the radio frequency circuit and the antenna may be disposed independent of the processor 920 that performs baseband processing. For example, in a distributed scenario, the radio frequency circuit and the antenna may be disposed remotely and independent of the communication apparatus.

A specific connection medium between the communication interface 910, the processor 920, and the memory 930 is not limited in this embodiment of this application. In this embodiment of this application, in FIG. 9, the memory 930, the processor 920, and the communication interface 910 are connected through a bus 940, and the bus is represented by using a thick line in FIG. 9. A connection manner between other components is merely an example for description, and constitutes no limitation. The bus may be classified into an address bus, a data bus, a control bus, and the like. For ease of representation, only one thick line is used to represent the bus in FIG. 9, but this does not mean that there is only one bus or only one type of bus.

When the apparatus 90 is specifically an apparatus used in an access network device or a RoF device, for example, when the apparatus 90 is specifically a chip or a chip system, the communication interface 910 may output or receive a baseband signal. When the apparatus 90 is specifically an access network device or a RoF device, the communication interface 910 may output or receive a radio frequency signal. In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in embodiments of this application. The general-purpose processor may be a microprocessor or any conventional processor or the like. The operations in the methods disclosed with reference to embodiments of this application may be directly performed by a hardware processor, or may be performed by a combination of hardware in the processor and a software module.

An embodiment of this application further provides a computer-readable storage medium. The computer-readable storage medium stores instructions. When the instructions are run on a processor, the method procedure in the method embodiment in FIG. 5 is implemented.

An embodiment of this application further provides a computer program product. When the computer program product is run on a processor, the method procedure in FIG. 5 in the foregoing method embodiment is implemented.

An embodiment of this application further provides a positioning system. The positioning system includes one or more of the access network device and the RoF device in the foregoing embodiments.

It should be noted that, for brief description, the foregoing method embodiments are described as a series of action combinations. However, persons skilled in the art should appreciate that this application is not limited to the described action sequence, because some operations may be performed in another sequence or simultaneously according to this application. In addition, persons skilled in the art should also appreciate that embodiments described in this specification all belong to example embodiments, and the related actions and modules are not necessarily required in this application.

Mutual reference may be made between the descriptions of embodiments provided in this application, and the descriptions of embodiments each have a focus. For a part not described in detail in an embodiment, refer to related descriptions in another embodiment. For convenient and brief description, for functions of the apparatuses and devices provided in embodiments of this application and operations performed by the apparatuses and devices, refer to related descriptions of the method embodiments of this application. The method embodiments and the apparatus embodiments may also be mutually referenced, combined, or cited.

Finally, it should be noted that, the foregoing embodiments are merely intended to describe the technical solutions in this application other than limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in embodiments of this application.

What is claimed is:

1. A clock frequency determining method at an access network device, wherein the method comprises:

receiving a combined optical signal from a radio over fiber (RoF) device, wherein the combined optical signal comprises an optical signal of a first frequency coupled with an optical signal of a second frequency;

converting the combined optical signal into an electrical signal; and setting a local clock frequency based on a signal frequency of the electrical signal and a first preset rule, wherein the signal frequency of the electrical signal is equal to an absolute value of a frequency difference between the first frequency and the second frequency, wherein the method further comprises synchronizing local clock time of the access network device with clock time of a further access network device in a positioning system in which the access network device is located, and the synchronizing the local clock time of the access network device with the clock time of the further access network device comprises exchanging a message including timestamp information with the further access network device.

2. The method according to claim 1, wherein the first preset rule comprises:

the local clock frequency is the signal frequency of the electrical signal.

3. The method according to claim 1, wherein the first preset rule comprises:

$$f_0=f_1/N,$$

where $f_0$ represents the local clock frequency, $f_1$ represents the signal frequency of the electrical signal, and N is an integer greater than 1.

4. The method according to claim 1, wherein the method further comprises:

upon synchronization of the local clock frequency and the local clock time with a clock frequency and the clock time of the further access network device in the positioning system, receiving a positioning signal from a terminal device, and determining a receiving timestamp at which the positioning signal is received; and sending the positioning signal and the receiving timestamp to a positioning platform, to enable the positioning platform to, based on the positioning signal and the receiving timestamp, determine a location of the terminal device.

5. The method according to claim 4, wherein the access network device is an ultra-wideband (UWB) access network device, and the sending the positioning signal and the receiving timestamp to the positioning platform comprises:

sending the positioning signal and the receiving timestamp to the positioning platform through a cellular-network access network device connected to the UWB access network device.

6. The method according to claim 5, wherein the cellular-network access network device is connected to the UWB access network device by a wired connection.

7. The method according to claim 1, wherein the absolute value of the frequency difference between the first frequency and the second frequency is not less than a preset threshold.

8. The method according to claim 7, wherein the preset threshold is 63.8976 GHz.

9. The method according to claim 1, wherein the message exchanged between the access network device and the further access network device comprises the timestamp information and coordinate information of a reference access network device.

10. A clock frequency determining method at a radio over fiber (RoF) device, wherein the method comprises:

generating a combined optical signal, by coupling an optical signal of a first frequency and an optical signal of a second frequency; and sending the combined optical signal to access network devices in a positioning system in which the RoF device is located, to synchronize the access network devices to a clock frequency determined based on an absolute value of a frequency difference between the first frequency and the second frequency, wherein the access network devices further synchronize local clock times of the access network devices with each other, by exchanging messages including time-stamp information with each other.

11. The method according to claim 10, wherein the absolute value of the frequency difference between the first frequency and the second frequency is not less than a preset threshold.

12. The method according to claim 11, wherein the preset threshold is 63.8976 GHz.

13. A communication apparatus, wherein the communication apparatus is an access network device, and the apparatus comprises:

a transceiver configured to receive a combined optical signal from a radio over fiber (RoF) device, wherein the combined optical signal comprises an optical signal of a first frequency coupled with an optical signal of a second frequency;

an optical-to-electrical converter configured to convert the combined optical signal into an electrical signal; and a processor configured to set a local clock frequency based on a signal frequency of the electrical signal and a first preset rule, wherein the signal frequency of the electrical signal is equal to an absolute value of a frequency difference between the first frequency and the second frequency, wherein the processor is further configured to perform synchronizing local clock time of the access network device with clock time of a further access network device in a positioning system in which the access network device is located, and in the synchronizing the local clock time of the access network device with the clock time of the further access network device, the transceiver is further configured to exchange a message including timestamp information with the further access network device.

14. The communication apparatus according to claim 13, wherein the first preset rule comprises:

the local clock frequency is the signal frequency of the electrical signal.

15. The communication apparatus according to claim 13, wherein the first preset rule comprises:

$$f_0 = f_1/N,$$

where $f_0$ represents the local clock frequency, $f_1$ represents the signal frequency of the electrical signal, and N is an integer greater than 1.

16. The communication apparatus according to claim 13, wherein the transceiver is further configured to, upon synchronization of the local clock frequency and the local clock time with a clock frequency and the clock time of the further access network device in the positioning system, receive a positioning signal from a terminal device, the processor is further configured to determine a receiving timestamp at which the positioning signal is received, and the transceiver is further configured to send the positioning signal and the receiving timestamp to a positioning platform, to enable the positioning platform to, based on the positioning signal and the receiving timestamp, determine a location of the terminal device.

17. The communication apparatus according to claim 16, wherein the access network device is an ultra-wideband (UWB) access network device, and the transceiver is configured to:

send the positioning signal and the receiving timestamp to the positioning platform through a cellular-network access network device connected to the UWB access network device.

18. The communication apparatus according to claim 13, wherein the absolute value of the frequency difference between the first frequency and the second frequency is not less than a preset threshold.

19. The communication apparatus according to claim 18, wherein the preset threshold is 63.8976 GHz.

20. The communication apparatus according to claim 13, wherein the message exchanged between the access network device and the further access network device comprises the timestamp information and coordinate information of a reference access network device.

* * * * *